United States Patent [19]

Weiland et al.

[11] 4,086,024

[45] Apr. 25, 1978

[54] APPARATUS FOR CONNECTING A ROTOR BLADE TO A ROTOR HUB

[75] Inventors: Emil Weiland, Hohenbrunn; Alois Schwarz, Putzbrunn; Karl-Heinz Mautz, Ottobrunn; Hubert Frommlet, Munich, all of Germany

[73] Assignee: Messerschmitt-Boelkow-Blohm Gesellschaft mit beschraenkter Haftung, Munich, Germany

[21] Appl. No.: 723,440

[22] Filed: Sep. 15, 1976

[30] Foreign Application Priority Data

Sep. 20, 1975 Germany .............................. 2541998

[51] Int. Cl.² ............................................ B64C 27/48
[52] U.S. Cl. .................................. 416/140; 416/107; 416/135
[58] Field of Search .................. 416/106, 107, 134 A, 416/140 A

[56] References Cited

U.S. PATENT DOCUMENTS

| | | | |
|---|---|---|---|
| 1,948,457 | 2/1934 | Larsen | 416/106 |
| 1,950,080 | 3/1934 | Cierva | 416/107 |
| 2,122,450 | 7/1938 | Campbell | 416/106 |
| 3,556,673 | 1/1971 | Killian | 416/134 A |
| 3,790,302 | 2/1974 | Pascher | 416/134 A |
| 3,967,918 | 7/1976 | Mouille | 416/134 A |

FOREIGN PATENT DOCUMENTS 527,572 7/1956 Canada .............................. 416/106

*Primary Examiner*—Everette A. Powell, Jr.
*Attorney, Agent, or Firm*—W. G. Fasse; W. W. Roberts

[57] ABSTRACT

A rotor blade is connected to a rotor hub, for example, in a helicopter, by at least one pair of damping elements and by a blade connector bolt. The damping elements comprise metal discs and layers of elastomeric material arranged in sandwich fashion. The damping elements are arranged symmetrically relative to the rotor blade, as well as to the blade connector bolt. Furthermore, the damping elements are connected in a force transmitting manner to the rotor blade on the one hand and to the rotor hub on the other hand.

12 Claims, 8 Drawing Figures

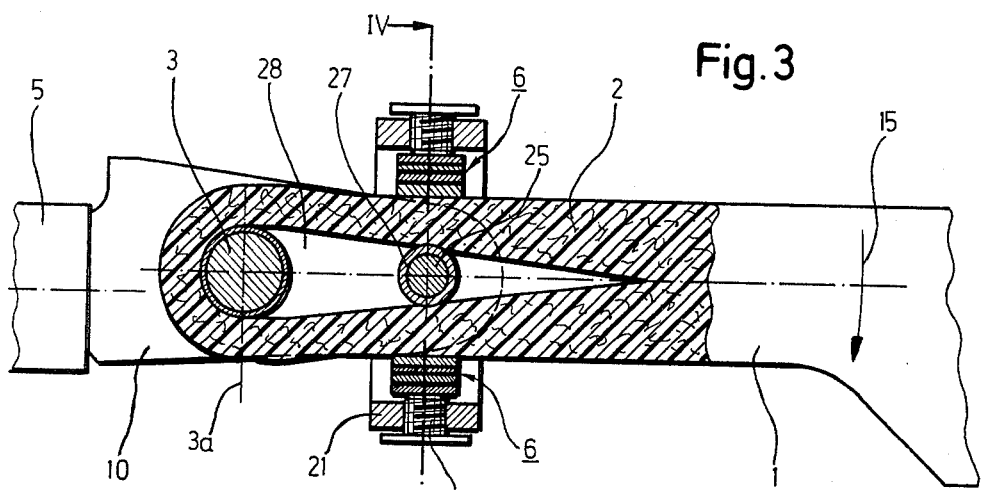
Fig. 3
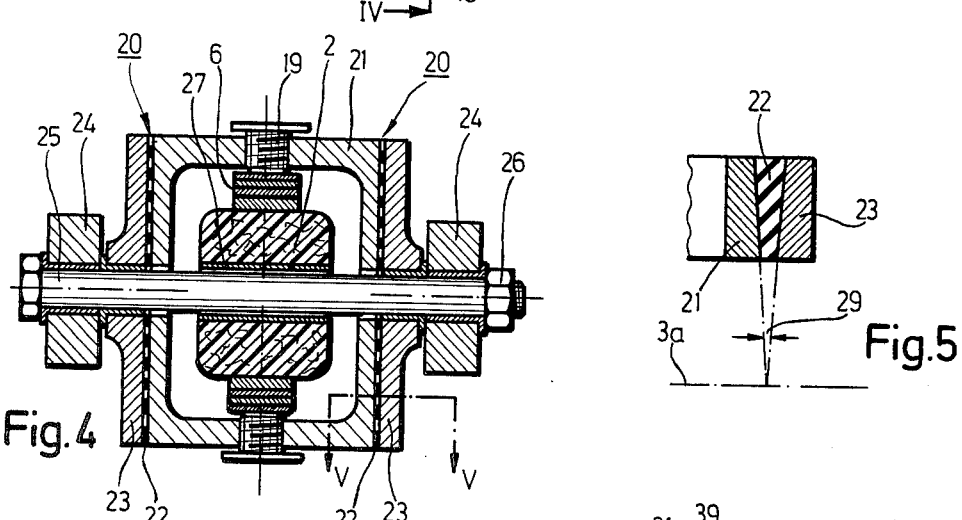
Fig. 4
Fig. 5
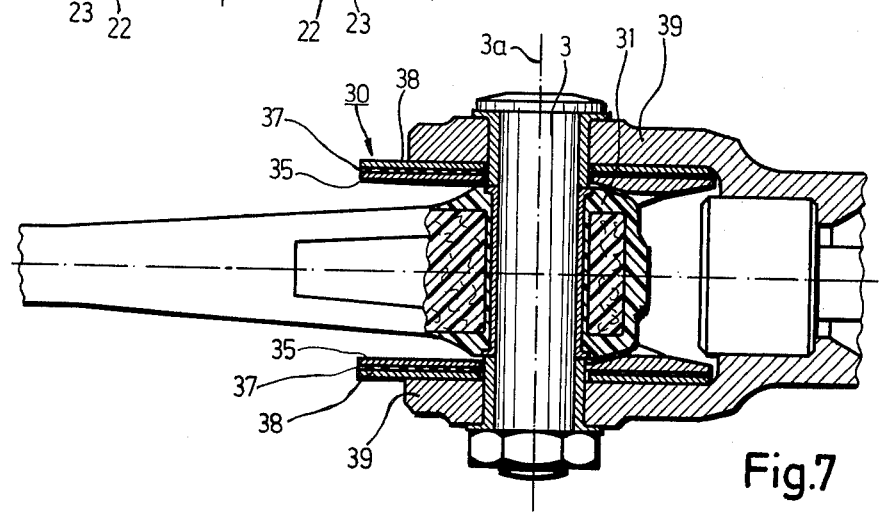
Fig. 7

APPARATUS FOR CONNECTING A ROTOR BLADE TO A ROTOR HUB

BACKGROUND OF THE INVENTION

The present invention relates to an apparatus for connecting a rotor blade to a rotor hub, more specifically, for connecting a helicopter rotor blade to the hub of the drive shaft. Such connecting apparatus conventionally includes a blade connector bolt and a dampened connection between the rotor blade and the rotor hub.

The forces effective on a rotor or rather on a rotating blade and on the anchoring means connecting the blade to the rotor hub, comprise centrifugal force components as well as static and dynamic shearing force components and bending moments. Especially the bending moments are caused by periodically recurring wobbling and swivel motions of the rotor blade.

German Pat. No. 1,531,675 discloses in connection with hingeless rotors to take up the wobbling and swivel motions substantially ahead of the blade root to avoid the effect thereof on the connections of the blade to the rotor shaft. This is accomplished by constructing the neck section of the rotor blade to be yielding to bending moments but stiff relative to torsion. However, in such a construction it is not possible to increase the length of the neck section, which has a low resistance to bending, to any desired degree, because such an increase would adversely affect the aerodynamic characteristics of the rotor blade. Furthermore, it is unavoidable that the bending and shearing deformations in combination with the effective centrifugal forces are transmitted to the connecting hardware between the root of the rotor blade and the rotor drive shaft. As a result, these transmitted deformations and forces generate continuous friction forces between the blade grommet made of fiber reinforced synthetic material and the metal hardware. Such friction forces must be taken up or absorbed by the inner or inherent damping of the rotor blade and the connecting hardware. Since these forces cannot be precisely ascertained and since they may vary, the interfaces between the blade and the connecting hardware are subject to a continuous destructive wear and tear effect.

OBJECTS OF THE INVENTION

In view of the above, it is the aim of the invention to achieve the following objects singly or in combination:

to avoid the drawbacks of the prior art blade connector structures for hingeless rotors, more specifically, to efficiently dampen the swivel moments which are effective and to control or influence the take-up of the damping;

to control the friction coefficient of the damping elements in such a manner that the desired damping effect may be taken into account as a substantially constant factor;

to construct a connecting mechanism for a helicopter rotor blade which provides a two-fold support for such blade;

to construct the damping elements in such a manner that their damping characteristics are subject to calculation, so that they may easily be adapted to any requirements that may occur in connection with securing a rotor blade to a rotor shaft;

to construct the connecting apparatus in such a manner that the rotor blades may easily be folded for the purpose of transporting or storing; and to construct the connecting mechanism so that all four rotor blades may be folded back in parallel to each other.

SUMMARY OF THE INVENTION

According to the invention, there is provided a connecting apparatus for securing the rotor blades to a rotor hub, for example, in a helicopter, wherein the damping means between the rotor blade and the rotor hub comprise at least one pair of damping elements arranged symmetrically relative to the axis of the rotor blade and relative to the blade connector bolt and connected to the rotor blade, as well as to an inner sleeve of the rotor hub in a force transmitting manner.

According to a further embodiment of the invention the damping means comprise elastomeric elements including discs of metal and of an elastomeric material, wherein an inner metal plate is secured to the rotor blade in a manner to resist shearing forces, and wherein an outer metal plate is secured to an inner sleeve of the rotor hub, again in a force transmitting manner.

In a first or preferred example embodiment of the invention, a pair of elastomeric elements with discs extending perpendicularly to the direction of the rotor blade profile, is arranged between the rotor blade neck and two fork members of the inner sleeve of the rotor hub.

BRIEF FIGURE DESCRIPTION

In order that the invention may be clearly understood, it will now be described, by way of example, with reference to the accompanying drawings, wherein:

FIG. 3 is a view similar to that of FIG. 1, however, showing another example embodiment of a connecting apparatus according to the invention for connecting a rotor blade to an inner sleeve of a rotor hub;

FIG. 4 is a sectional view through the embodiment of FIG. 3 along the section line IV—IV in FIG. 3;

FIG. 5 is a partial sectional view along the section line V—V in FIG. 4;

FIG. 7 is a sectional view through FIG. 6 along the section line VII—VII in FIG. 6.

Figure 1:
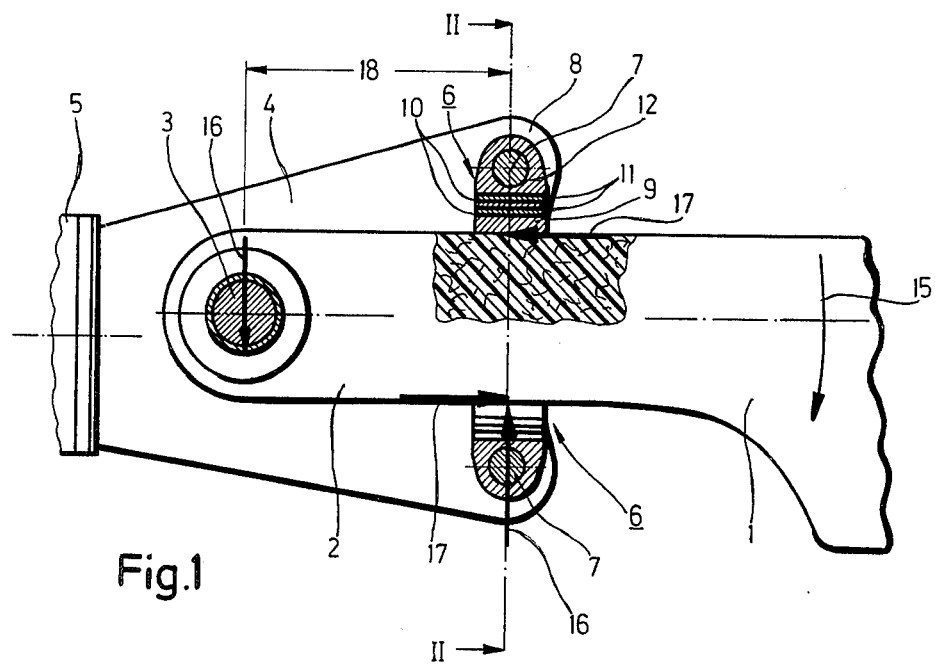
FIG. 1 illustrates a top plan view partially in section and with parts broken away to simplify the illustration of the connection of a rotor blade to a rotor hub and showing a first embodiment of the invention, whereby the section line I—I extends as shown in FIG. 2.

DETAILED DESCRIPTION OF PREFERRED EXAMPLE EMBODIMENTS:

FIG. 1 shows a plan view of the rotor blade 1 which merges into a blade neck 2, the left hand end of which is secured to a fork member 4 by means of a blade connector bolt 3. The fork member 4 which is part of the connector hardware, is secured to an inner sleeve 5 of a rotor hub, the details of which are not shown, since the hub structure as such is not part of the invention. Two damping units or elements 6 are arranged to contact the neck 2 of the blade 1 at two opposite points. The damping units 6 are connected to the fork member 4 by means of bolts 7 extending through holes in the lobes 8 of the fork member 4.

Figure 2:
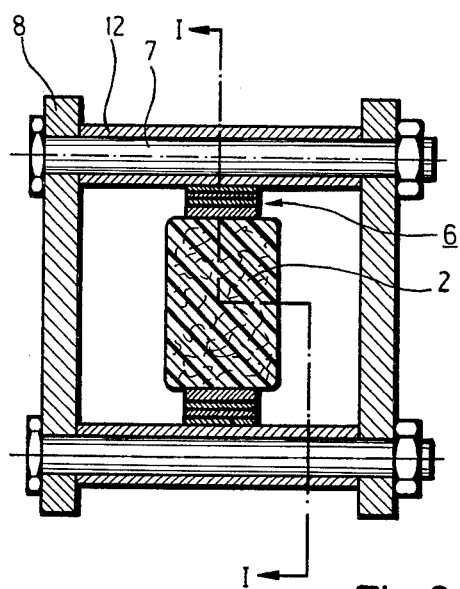
FIG. 2 is a sectional view through the connecting apparatus according to FIG. 1, whereby the section extends along section line II—II in FIG. 1.

Each damping unit 6 comprises, according to the invention, a number of metal discs and layers or sheets of elastomeric material arranged in alternate fashion. The elastomeric material may, for example, be rubber, which is arranged in such a manner that an inner metal plate 9 is secured to the blade neck 2 and that an outer metal member 12 including an eyelet for the bolt 7 is arranged on the outer side of the unit 6. Rubber discs 10 and metal discs 11 are sandwiched between the inner metal plate 9 and the outer metal member 12, as best seen in FIG. 2.

The swivelling moment 15 indicated by the respective arrow subjects the outer fibers of the rotor blade 1, especially in the region of the blade neck 2 to a lengthening, as well as to a compression. The swivelling moment 15 may be represented by a force pair 16 which is taken up by the blade connector bolt 3. The elastomeric dampening units or elements 6 are deformed by the swivelling moment and the deformation is of a shearing type, whereby the required damping is produced. The damping forces are represented by reference number 17. The following parameters for influencing the damping to be taken up as well as for influencing the natural swivel frequency of the rotor blade 1 may be taken into account. By varying the spacing 18 between the damping element 6 and the blade connector bolt 3, as well as the thickness and the cross section of the material of the elastomeric discs 10, the damping may be influenced and varied in a desirable manner. The wobbling motion of the rotor blade is not influenced, because the elastomeric elements are very soft or resilient in the wobbling direction.

As compared to prior art blade connecting devices which include metal hardware with several blade connector bolts, it is an advantage of the invention that it is possible to simply withdraw the bolts 7 and to tilt the rotor blade 1 about the axis of the single blade connector bolt 3, whereby all rotor blades may be folded, for example, to factilitate their transport or storage.

A further embodiment of the invention is illustrated in FIGS. 3 to 5 in which the blade neck 2 is also connected to elastomeric elements 6 at one end thereof, while the other end of the elastomeric elements 6 is secured to a frame 21 by means of pressure screws 19. In this embodiment two further elastomeric elements 20 are arranged at the sides of the frame 21 and perpendicularly to the elastomeric elements 6. The elastomeric elements 20 comprise the side members of the frame 21, elastomeric discs 22 and alternating plate members 23. The plate members 23 are secured to a fork 24 by means of bolts 25 and nuts 26. The fork 24 in turn is connected to the inner sleeve 5 of the rotor hub. The bolt 25 extends with free play all around through a bushing 27 which is inserted into a wedge shaped inner space 28 of the blade neck 2. The wedge shaped inner space 28 results from the manufacture of the neck end of the blade by placing strands of fiber reinforced synthetic material around the blade connector bolt 3, thereby forming a grommet or eye.

The swivelling moment 15 of the rotor blade is transmitted in this embodiment as a shearing force pair to the frame 21 through the elastomeric element 6 and further through the elastomeric element 20 into the fork 21, which in turn is connected to the inner sleeve 5 of the rotor hub. This embodiment has the advantage that a double damping effect of the swivel moments is accomplished. The elastomeric discs 22 of the elastomeric elements 20 are constructed as shown in FIG. 5 so that their sides form an angle 29 which originates on the axis 3a of the blade connector bolt 3. This feature of the invention has the advantage that the shearing stress in the elastomeric discs 22 is the same in all locations. As a result of this advantage an even larger damping effect and a longer useful life of the disc 22 is accomplished by the avoidance of a non-uniform stress distribution.

With the aid of the pressure screws 19 it is possible to precisely adjust the sweep back angle for each rotor blade 1. Moreover, by withdrawing the blade connector bolt 3, the rotor blade 1 may be tilted in both directions through an angle 135° C which means that all four blades may be arranged in parallel to each other and backwardly, for example, to facilitate storage and/or transportation. Since the bolt 25 may be simply removed, it is possible to tilt the rotor blade through an angle of 90°.

Figure 6:
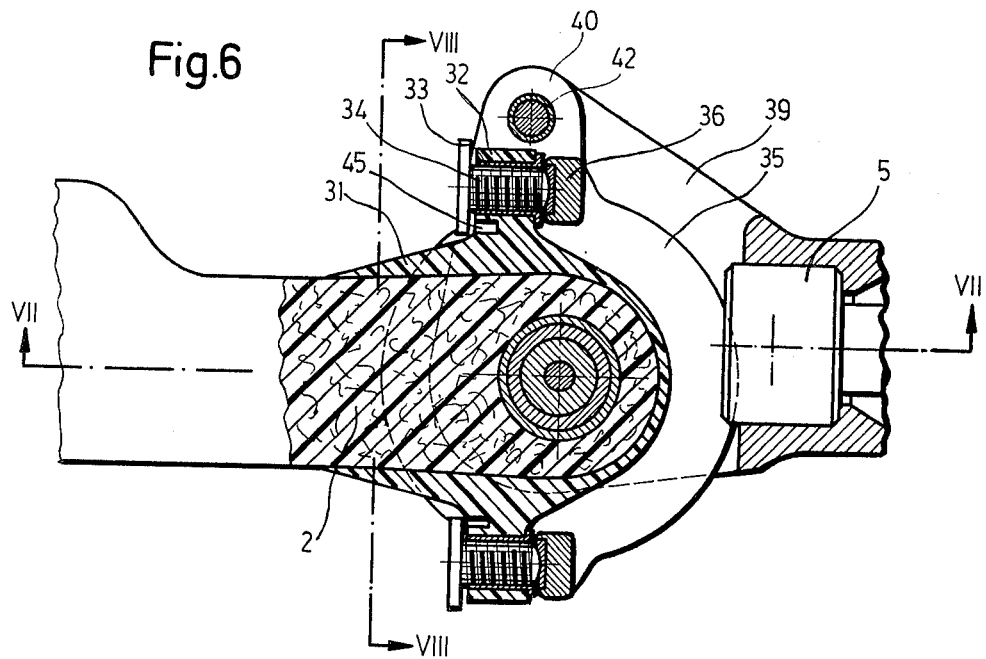
FIG. 6 is again a view similar to that of FIG. 1, however, illustrating a third example embodiment of a connecting apparatus according to the invention.
Figure 8:
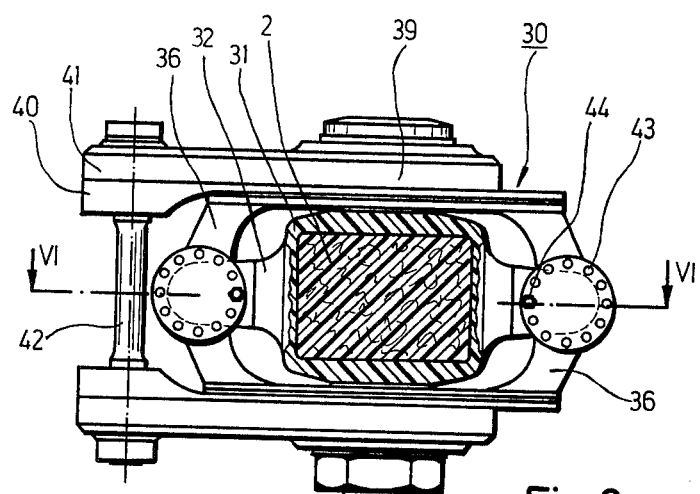
FIG. 8 is a sectional view along the section line VIII—VIII in FIG. 6.

FIGS. 6, 7 and 8 illustrate a further example embodiment according to the invention in which the swivel moment 15 is dampened by two large elastomeric ring elements 30. In this embodiment the blade neck 2 is surrounded on all sides in the region of the blade connector bolt 3 by a collar 31 having two extensions 32 provided with threaded bushings 33 engaged by pressure screws 34. Each of the elastomeric elements 30 comprises an inner metal disc 35 connected through the lands 36 to each other and contacted by the pressure screws 34. Each of these elements further comprises an elastomeric washer 37 and an outer metal disc 38. The cross section of the elastomeric ring washer 37 tapers from the outside inwardly by an angle having its origin or apex in the axis 3a of the blade connector bolt 3. The outer metal discs 38 are either connected to fork hardware members 39 or to the inner sleeve 5, which is constructed as a holding means capable of taking up centrifugal force. In addition, the elements 38 and 39 are connected to the bolt 42 by means of eyes 40 and 41, whereby the connection is screwed down to be rigid against relative rotation between the elements.

As in the previously described embodiment, the pressure screws 34 are also suitable for adjusting the sweepback angle of the rotor blade 1 similarly to the pressure screws 19. The pressure screws 34 also serve for transmitting the swivel moment. For the just described purposes the head of the pressure screws 34 is provided with a number of holes 43 arranged along the periphery thereof. Locking or safety screws 44 extend through these holes 43 and into bores 55 in the collar 31. In this embodiment it is also possible to withdraw the bolt 42 and to then tilt the rotor blade 1 to the right or left through an angle of 45°, whereby two blades may be folded in pairs forwarldy and backwardly.

The advantages of the invention may be highlighted by the following comparison of the take up and damping of the swivel moments in a conventional apparatus and in a present apparatus. In the conventional apparatus according to German Pat. No. 1,531,375 the rotor blade constitutes a beam subject to a bending moment, one end of which is rigidly secured. In this type of structure the swivel moments must be taken up by the inner friction in the material of which the blade is made and by the friction in the connecting hardware. In this conventional construction the outer fibers of the blade in the region of the connecting hardware are subjected to tension stress by the alternating swivel moments. Thus, the friction between the blade and the connecting hardware must cause the required damping. However, the friction coefficient which substantially determines the size of the damping to be taken up between the blade and the hardware may vary substantially. Therefore, the damping of the swivel moments also varies considerably and it is not assured that the damping is sufficient.

Contrary to the foregoing the blade connector according to the invention replaces the friction damping in the hardware itself, as described above, by the friction in the elastomeric units, for example, units or elements 6. According to the first example embodiment described above with reference to FIGS. 1 and 2, the elastomeric elements of the invention are connected to both sides of the blade neck and through a lever arm in the form of a fork to the blade connector bolt. Compared to the rigidly connected blade connector neck, the structure of the invention has the advantage that the blade is actually supported by two separate means. According to the invention the swivel moment is taken up at the blade connector bolt and at the elastomeric elements. Under the influence of the swivel moment the outer fibers of the entire blade are subjected to tension and compression stress, whereby the elastomeric elements which are connected to the blade neck in a shearing stress resisting manner, are subjected to shearing stress, whereby the required damping is produced. The parameters for influencing the damping and the natural swivel frequency of the rotor blade include the spacing between the elastomeric elements and the blade connector bolt, the cross section, the number, as well as the material of the elastomeric discs. These elements may be thus calculated. As a result, the damping may be influenced in a relatively wide range so that the required friction is easily adapted to the requirements of the particular situation, especially since each parameter may be varied or influenced substantially independently of any of the other parameters.

Incidentally, the neck 2 of the rotor blade is made of fiber reinforced synthetic material, as mentioned above. Such fibers may, for example, be glass fibers or carbon fibers and/or synthetic fibers, for example, known under the tradename "KEVLAR." The embedding material may, for example, be an epoxy resin. The collar 31 is also manufactured from the same materials.

Although the invention has been described with reference to specific example embodiments, it is to be understood, that it is intended to cover all modifications and equivalents within the scope of the appended claims.

What is claimed is:

1. In a hingeless helicopter rotor structure having a hub, a plurality of pairs of arms rigidly connected to said hub and extending radially therefrom, a first bolt means journaled in each pair of arms and extending parallel to the axis of said hub, a plurality of rotor blades each having a neck rigidly affixed thereto, each bolt extending through a separate one of said necks for pivotally, positively mounting said rotor blades to said hub, second bolt means extending between each pair of arms further radially outwardly from the axis of said hub than said first bolt means, damping means comprising a first and second spaced apart metal plate with at least one elastomeric element sandwiched therebetween, and means mounting said damping means to damp relative movement of said rotor neck with respect to said second bolt means in response to rotation of said neck about the axis of said first bolt means, whereby said first and second bolt means and damping means cooperate to transmit forces between said rotor blade and rotor hub in a damped manner.

2. An apparatus for securing a rotor blade to a rotor hub in hingeless helicopter rotors with damping elements for damping said rotor blade, wherein said damping elements comprise metal and elastomeric layers including disks arranged substantially in parallel with each other on both sides of the neck of said rotor blade, said damping elements comprising an inner metal plate secured rigidly to said rotor blade neck with respect to shear forces, an outer metal plate rigidly secured to an inner sleeve of the rotor hub with respect to shear forces, and at least one elastomeric disk between and interconnecting said metal plates, a blade connector bolt extending through said rotor blade neck and coupling said rotor blade neck to said rotor hub, said metal plates and said elastomeric disks cooperating with said blade connector bolt for transmitting forces between said rotor blade and rotor hub.

3. The apparatus according to claim 2, wherein said rotor blade and neck are formed of a fiber reinforced plastic material.

4. The apparatus according to claim 2, wherein said rotor blade neck has an upper and a lower side, further comprising fork means secured at one end thereof to said rotor hub, and wherein said damping elements comprise a pair of elastomeric elements, one elastomeric element being arranged between said upper side of said rotor blade neck and the fork means, the other elastomeric element being arranged between said lower side of said rotor blade and said fork means.

5. The apparatus according to claim 1, wherein said rotor blade neck has an upper and a lower side, said apparatus further comprising frame means, arm means comprising fork means secured at one end thereof to said rotor hub and at the other end thereof to said frame means, and wherein said damping elements comprise a pair of elastomeric elements, one elastomeric element being arranged between said upper side of said rotor blade neck and said frame means while the other elastomeric element is arranged between the lower side of said rotor blade neck and said frame means, whereby the rotor blade neck extends through said frame means, and pressure adjustment means extending through said frame means into cooperating relationship with said damping means for adjusting the elasticity of said elastomeric means.

6. The apparatus according to claim 5, wherein said frame means comprise upper and lower members and side members interconnecting said upper and lower members and further elastomeric means, as well as plate means, said further elastomeric means being inserted between said side members of the frame and said plate means whereby the side members and the plate means, as well as the further elastomeric means extend in parallel to said rotor blade neck, and means extending through said frame means and through said rotor blade neck but out of contact therewith, for connecting said frame means to said fork means.

7. The apparatus of claim 6, comprising arm means having a first end secured to said rotor hub and a second free end extending away from said hub, and journal means including said blade connector bolt securing one end of said rotor blade neck to said arm means intermediate the ends of said arm means, said journal means defining a journal axis.

8. The apparatus according to claim 7 wherein said further elastomeric means taper toward said journal axis.

9. The apparatus according to claim 2, wherein said damping elements comprise elastomeric elements and elastomeric jacket means extending around said one end of said rotor blade neck, said elastomeric elements extending on opposite sides of said rotor blade neck and around the axis of said blade connector bolt, land means interconnecting said elastomeric elements with each other, projections forming an integral part of said elastomeric jacket means and extending away from said elastomeric jacket means at opposite sides thereof, pressure adjustment means extending through said projections and into cooperating relationship with said lands, and means connecting said elastomeric elements to said rotor hub.

10. The apparatus according to claim 9, comprising arm means connected to said rotor hub, said bolt being journaled in said arm means, said arm means comprising fork means, said bolt extending through said fork means, through said elastomeric elements, through said elastomeric jacket means and through said rotor blade neck.

11. The apparatus according to claim 9, wherein each of said elastomeric elements comprises an elastomeric ring member sandwiched between two metal washers, one of said metal washers cooperating with said pressure adjustment means through said lands, the other metal washer being connected to said arm means by said connecting means.

12. The apparatus according to claim 11, wherein each of said elastomeric ring members tapers radially inwardly toward the axis of said blade connector bolt.

* * * * *

UNITED STATES PATENT OFFICE
CERTIFICATE OF CORRECTION

Patent No. 4,086,024          Dated April 25, 1978

Inventor(s) Emil Weiland et al

It is certified that error appears in the above-identified patent and that said Letters Patent are hereby corrected as shown below:

Column 6, line 34, "claim 1" should read --claim 2--.

Signed and Sealed this

Twenty-ninth Day of August 1978

[SEAL]

Attest:

RUTH C. MASON
Attesting Officer

DONALD W. BANNER
Commissioner of Patents and Trademarks